US012793666B2

(12) United States Patent
Amundson et al.

(10) Patent No.: US 12,793,666 B2
(45) Date of Patent: Nov. 10, 2026

(54) STAGED GATE VOLTAGE CONTROL

(71) Applicant: E INK CORPORATION, Billerica, MA (US)

(72) Inventors: Karl Raymond Amundson, Cambridge, MA (US); Yuval Ben-Dov, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 19/346,928

(22) Filed: Oct. 1, 2025

(65) Prior Publication Data

US 2026/0031058 A1 Jan. 29, 2026

Related U.S. Application Data

(63) Continuation of application No. 18/901,550, filed on Sep. 30, 2024, now Pat. No. 12,456,436.

(Continued)

(51) Int. Cl.
*G09G 3/34* (2006.01)
*G02F 1/167* (2019.01)

(Continued)

(52) U.S. Cl.
CPC ............ *G09G 3/344* (2013.01); *G02F 1/167* (2013.01); *G02F 1/16766* (2019.01); *G02F 1/1685* (2019.01); *G09G 2300/08* (2013.01); *G09G 2310/06* (2013.01); *G09G 2310/068* (2013.01); *G09G 2320/0209* (2013.01); *G09G 2320/0219* (2013.01)

(58) Field of Classification Search
CPC ............... G09G 3/344; G09G 2300/08; G09G 2310/06; G09G 2310/068; G09G 2320/0209; G09G 2320/0219; G02F 1/167; G02F 1/16766; G02F 1/1685
See application file for complete search history.

(56) References Cited

U.S. PATENT DOCUMENTS 4,041,481 A 8/1977 Sato
7,304,622 B2 * 12/2007 Kobayashi ......... H03K 17/6257 345/94

(Continued)

OTHER PUBLICATIONS

European Patent Office, "International Search Report and Written Opinion", PCT/US2024/049557, Nov. 29, 2024.

*Primary Examiner* — Douglas Wilson
(74) *Attorney, Agent, or Firm* — Min G. Song

(57) ABSTRACT

An electro-optic display and driving method are disclosed. The electro-optic display includes a layer of electrophoretic material disposed between a common electrode and a backplane. The backplane includes an array of pixel electrodes, each coupled to a pixel transistor. A controller provides time-dependent voltages to the gate line, the source line, and the common electrode of each pixel transistor. The driving method includes applying a first stage voltage to the gate line. The first stage voltage has a first magnitude that is substantially half of a gate low voltage for placing the pixel transistor in a non-conducting state. The first stage voltage is maintained on the gate line for a first period of time. Then, a second stage voltage is applied to the gate line, where the second stage voltage has a second magnitude that is substantially the gate low voltage for placing the pixel transistor in the non-conducting state.

22 Claims, 8 Drawing Sheets

Related U.S. Application Data

(60) Provisional application No. 63/588,290, filed on Oct. 5, 2023.

(51) Int. Cl.

*G02F 1/16766* (2019.01)
*G02F 1/1685* (2019.01)

(56) References Cited

U.S. PATENT DOCUMENTS

| | | | | |
|---|---|---|---|---|
| 8,248,341 | B2 | 8/2012 | Neugebauer | |
| 8,300,006 | B2 * | 10/2012 | Zhou | G09G 3/344 345/94 |
| 8,514,213 | B2 | 8/2013 | van Veenendaal et al. | |
| 9,013,383 | B2 | 4/2015 | Hough et al. | |
| 10,276,109 | B2 * | 4/2019 | Crounse | G09G 3/344 |
| 10,803,813 | B2 | 10/2020 | Crounse et al. | |
| 11,640,803 | B2 | 5/2023 | Lin et al. | |
| 11,756,494 | B2 | 9/2023 | Paykin et al. | |
| 11,922,893 | B2 | 3/2024 | Crounse et al. | |
| 12,027,129 | B2 | 7/2024 | Sim et al. | |
| 12,218,661 | B1 | 2/2025 | Lee | |
| 2007/0052646 | A1 | 3/2007 | Ishiguchi | |
| 2008/0150928 | A1 | 6/2008 | Van Der Hoef et al. | |
| 2011/0012889 | A1 | 1/2011 | Miyamoto | |
| 2015/0035742 | A1 * | 2/2015 | Yamazaki | G09G 3/3446 345/107 |
| 2023/0040814 | A1 | 2/2023 | Amundson et al. | |

* cited by examiner

STAGED GATE VOLTAGE CONTROL

CROSS-REFERENCE TO RELATED APPLICATIONS

This application is a continuation of U.S. patent application Ser. No. 18/901,550, filed Sep. 30, 2024, which claims priority to U.S. Provisional Application No. 63/588,290, filed on Oct. 5, 2023.

The entire disclosures of the aforementioned applications and any patent, published application, or other published work referred to below are incorporated by reference herein in their entireties.

FIELD OF THE INVENTION

The subject matter disclosed herein relates to electro-optic displays and methods for driving electro-optic displays. In particular, the subject matter disclosed herein relates to electro-optic displays and methods for driving electro-optic displays that power up and power down gate voltages such that the amplitude of the voltage artifact induced across the electrophoretic medium of an active-matrix display is reduced or eliminated.

BACKGROUND OF THE INVENTION

Electro-optic displays typically comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor.

Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again, the assignment of sources to rows and gates to columns is conventional but essentially arbitrary, and could be reversed if desired. The row electrodes are connected to row driving circuitry, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column driving circuitry, which places upon the various column electrodes voltages selected to drive the pixels in the selected row to their desired optical states. (The aforementioned voltages are relative to a common front electrode which is conventionally provided on the opposed side of the electro-optic medium from the non-linear array and extends as a substantially planar layer across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

Typically, electro-optic displays are encased by a frame or a bezel to hide the electrical connections required for the row and column driving circuitry of the display which is generally routed along the perimeter of the display. However, for some applications, it is preferred that substantially the entire viewing area of an electro-optic display be optically active. As one example, an active billboard can be made by tiling a plurality of electro-optic displays together to create a large format display. In such applications, it is preferred that the space between the tiled displays is minimized. Further, even for single panel displays, it is generally preferable to minimize the dimensions of the display bezel or frame that overlaps the active area of the display in order to maximize the viewable arca.

To accommodate such requirements, one strategy for reducing or eliminating a need for a bezel or border frame that extends beyond the pixels themselves is to route many of the traces or wires (e.g., "T-wires") controlling the switching of the pixel thin-film transistors ("TFTs") on the backside of the display panel (i.e., the side opposite the display pixels on a front side of the panel) and through one or more vias (sometimes referred to as "via holes" or "conductive vias") toward the front side of the display panel. For example, such T-wires can be routed along the back side of the display panel perpendicular to the TFT gate lines routed on the front side of the display panel to provide electrical connections to the row select signals of the driver IC, and vias can be used to connect each gate line to the T-wire of its respective row select signal.

It is typical that one separate T-wire and one separate via are used to establish a connection with each individual gate line, but there can be multiple T-wires in proximity to each pixel of the display. Because the display substrate is typically made from a non-conductive material, a capacitance can be created between a pixel electrode and the T-wires in proximity to it. This capacitive coupling can lead to unwanted optical defects such as varied optical characteristics or response across different areas of a display due to certain operations.

For example, prior to updating an electrophoretic display, any voltage planes or data and control signals used for driving the pixels of an active matrix display must be brought from a "resting" or power down voltage of approximately zero volts (e.g., ground) to some known initial voltage value. As one example, the gate lines of each pixel TFT of the active-matrix can be driven from a power down voltage to a "gate low" voltage, which is the voltage typically applied to the gate lines of "non-addressed" or deselected rows of the active matrix during display updates.

Conventional display driving techniques initially drive the pixel TFT gate lines continuously from a power down voltage to a gate low voltage having a magnitude or voltage value that is sufficiently negative to place the pixel TFTs in a non-conducting state. After updates to the electrophoretic display have concluded, the voltage applied to the gate lines is typically returned to the controller ground voltage (e.g., approximately zero volts) in a similar manner, i.e., the pixel TFT gate lines are continuously driven from the gate low voltage back to the power down voltage.

The gate low voltage is fed through the display select driver circuitry to the gate lines of the active-matrix display. When the gate low voltage is brought from zero volts to a negative value in preparation for an update, so are the gate lines and any associated T-wires used to connect to gate lines. Because these gate lines and associated T-wire lines are capacitively coupled to either pixel electrodes or through a dielectric layer in the backplane directly to the electrophoretic layer, the electrophoretic layer experiences a transient negative impulse or voltage artifact upon this "power up" event. After an update, when the gate low voltage is brought back to zero volts, the electrophoretic layer experiences a positive voltage transient or artifact. Both of these voltage artifacts can shift and degrade the optical state of the electrophoretic medium in proximity to the artifacts.

Conventional techniques have sought to mitigate the transient voltage impulse upon powering down the display voltage planes and data and control signals using a component configured to slowly dissipate the impulse, such as a resistor positioned within the circuitry that controls the voltage applied to each pixel. However, such a solution is passive in nature and does not accommodate fluctuations in requirements due to changes in environmental conditions or differences in the electrical properties of the electrophoretic layer. Further, such solutions do not address the voltage artifacts induced by setting signals such as the gate lines to an initial state prior to updating a display.

SUMMARY OF THE INVENTION

Accordingly, there is a need for electro-optic displays and methods for driving electro-optic displays that power up and power down a gate low voltage in a way that reduces the amplitude of the voltage artifact induced to the electrophoretic layer of an active-matrix display.

Accordingly, in one aspect, the subject matter disclosed herein includes a method for driving an electro-optic display. The electro-optic display includes a layer of electrophoretic material disposed between a common electrode and a backplane. The backplane includes an array of pixel electrodes. Each pixel electrode is coupled to a pixel transistor including a source electrode, a gate electrode, and a drain electrode. The gate electrode is coupled to a gate line, the source electrode is coupled to a source line, and the drain electrode is coupled to the pixel electrode. A controller provides time-dependent voltages to the gate line, the source line, and the common electrode. The method for driving includes applying a first stage voltage to the gate line, where the first stage voltage has a first magnitude that is substantially half of a gate low voltage for placing the pixel transistor in a non-conducting state. The method for driving also includes maintaining the first stage voltage on the gate line for a first period of time, and applying a second stage voltage to the gate line, where the second stage voltage has a second magnitude that is substantially the gate low voltage for placing the pixel transistor in the non-conducting state.

In another aspect, the subject matter disclosed herein includes an electro-optic display including a light-transmissive common electrode and a backplane including an array of pixel electrodes. The electro-optic display also includes a layer of electro-optic material disposed between the common electrode and the array of pixel electrodes, where each pixel electrode is coupled to a pixel transistor including a source electrode, a gate electrode, and a drain electrode, and where the gate electrode is coupled to a gate line, the source electrode is coupled to a source line, and the drain electrode is coupled to the pixel electrode. The electro-optic display also includes a controller capable of applying time-dependent voltages to the gate line, the source line, and the common electrode. The controller is configured to apply a first stage voltage to the gate line, where the first stage voltage has a first magnitude that is substantially half of a gate low voltage for placing the pixel transistor in a non-conducting state. The controller is further configured to maintain the first stage voltage on the gate line for a first period of time, and apply a second stage voltage to the gate line, where the second stage voltage has a second magnitude that is substantially the gate low voltage for placing the pixel transistor in the non-conducting state.

All of the aspects disclosed herein can include additional features. In some embodiments, the gate low voltage has a magnitude of substantially −35V. In some embodiments, the pixel transistor is an n-type transistor, and the gate low voltage has a negative polarity. In some embodiments, the pixel transistor is a p-type transistor, and the gate low voltage has a positive polarity.

In some embodiments, the first period of time is between 30 ms and 50 ms. In some embodiments, the second period of time is between 30 ms and 50 ms.

In some embodiments, applying the first stage voltage to the gate line causes a first voltage artifact on the layer of electrophoretic material. In some embodiments, the first period of time is greater than or equal to a discharge time of the first voltage artifact.

In some embodiments, applying the second stage voltage to the gate line causes a second voltage artifact on the layer of electrophoretic material. In some embodiments, the second period of time is greater than or equal to a discharge time of the second voltage artifact.

BRIEF DESCRIPTION OF DRAWINGS

Various aspects and embodiments of the application will be described with reference to the following figures. It should be appreciated that the figures are not necessarily drawn to scale.

DETAILED DESCRIPTION OF THE INVENTION

Figure 1A:
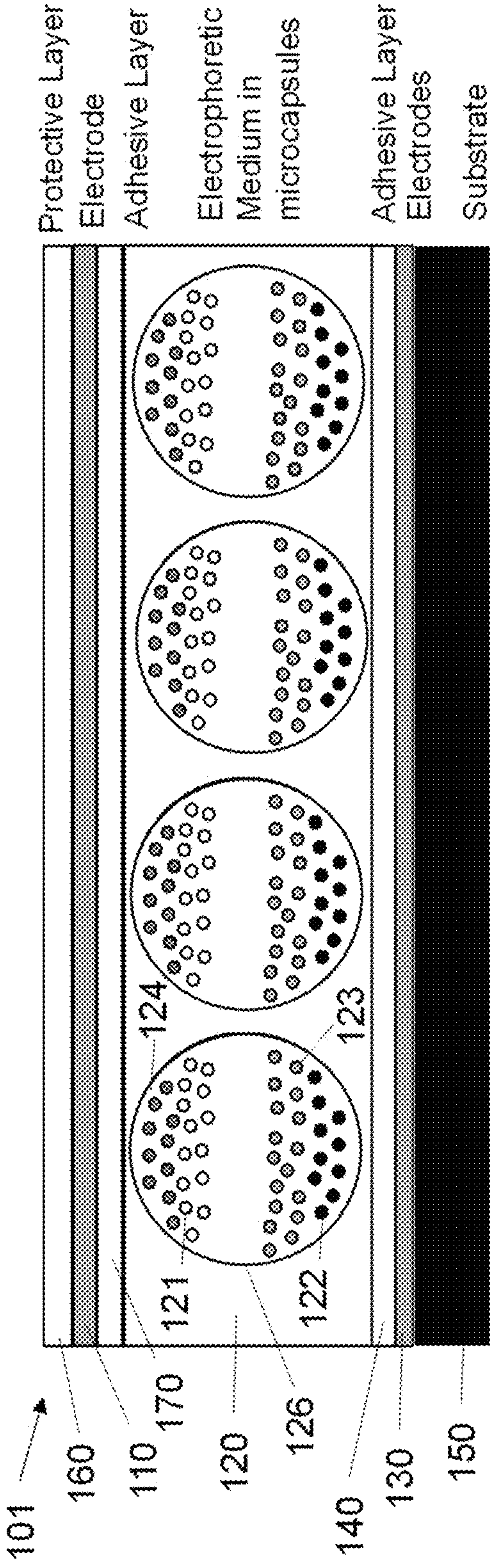
FIG. 1A is a representative cross-section of a four-particle electrophoretic display wherein the electrophoretic medium is encapsulated in capsules. The construction of FIG. 1A can be used for multi-particle electrophoretic media with both reflective and subtractive pigment particles.
Figure 1B:
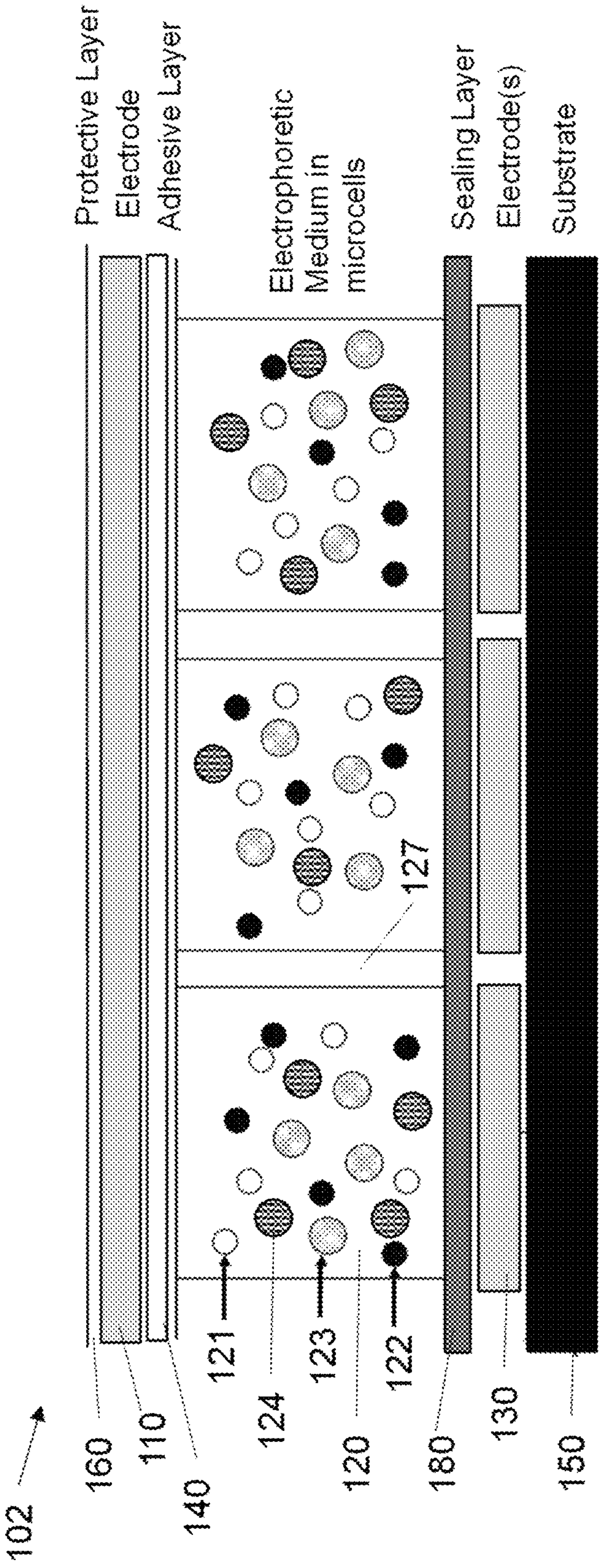
FIG. 1B is a representative cross-section of a four-particle electrophoretic display wherein the electrophoretic medium is encapsulated in microcells. The construction of FIG. 1B can be used for multi-particle electrophoretic media with both reflective and subtractive pigment particles.

The use of electro-optic display technology is expanding beyond "typical" display applications like TV screens and monitors to include display products such as electronic books, product labels, retail shelf labels, device monitoring indicators, wristwatches, signs, and promotional or advertising displays. Typically, electro-optic displays are encased by a frame or a bezel to hide the electrical connections of the display which generally lay along the perimeter of the display. In some applications, specifically large-scale tiled displays, it is generally preferred that the entire viewing area of an electro-optic display be optically active; for example, an active billboard made by tiling a plurality of electro-optic displays together to create a large format display. In such applications, consumers prefer that the entire viewing surface of each individual display is optically active and the space between the tiled displays is minimized. When done correctly, the tiled displays take on the look of a single continuous display.

An electrophoretic display ("EPD") is a type of electro-optic display that changes color by modifying the position of one or more charged colored particles with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders because the electrophoretic displays provide a book-like reading experience, use little power, and allow a user to carry a library of hundreds of books in a lightweight handheld device. Such devices are increasingly being adapted to display out-of-home (OOH) digital content, such as shelf labels, outdoor advertisement and transportation signage.

For many years, electrophoretic displays included only two types of charged color particles, black and white. (To be sure, "color" as used herein includes black and white.) The white particles are often of the light scattering type, and comprise, e.g., titanium dioxide, while the black particles are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black, white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP™) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta, and white particles with respect to the viewing surface will determine the color at each pixel. While this type of electrophoretic display allows for thousands of colors at each pixel, it is critical to carefully control the position of each of the (50 to 500 nanometersized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353,266, 10,467,984, 10,593,272, and 10,657,869.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids, and fluid additives; see for example U.S. Pat. Nos. 7,002,728 and 7,679,814;

(b) Capsules, binders, and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490;

8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors are lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white, and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both.

Electrophoretic displays capable of rendering any color at any pixel location have been described in U.S. Pat. Nos. 10,475,399 and 10,678,111. In the '399 patent, a display is described in which a white (light-scattering) pigment moves in a first direction when addressed with a low applied voltage and in the opposite direction when addressed with a higher voltage. In the '111 patent, a full-color electrophoretic display is described in which there are four pigments: white, cyan, magenta, and yellow, in which two of the pigments are positively-charged and two negatively charged. U.S. Patent Publication 2022/0082896 describes a full-color electrophoretic display in which there are four pigments: white, cyan, magenta, and yellow, in which the three colored pigments are positively-charged and white pigment negatively charged. Embodiments of the present invention of this type are referred to as CMYW embodiments.

In addition, there are multi-particle display designs in which the color pigments scatter light (i.e., reflective color particles). U.S. Pat. No. 10,339,876 describes a display of this type having black, white, and red particles capable of rendering three states. Similar display designs including four pigments can render four different colors, see, e.g., U.S. Pat. No. 9,922,603, or, by using a semi-transparent colored particle, such displays can render six colors, see, e.g., U.S. Pat. No. 11,640,803.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes, photonic crystals, quantum dots, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta, and cyan pigments preferably exhibit diffuse reflectances at 650, 650 and 450 nm, respectively, measured over a black background, of less than 2.5% under the same conditions. (The wavelengths chosen above for measurement of the yellow, magenta, and cyan pigments correspond to spectral regions of minimal absorption by these pigments.) Colored pigments meeting these criteria are hereinafter referred to as "non-scattering" or "substantially non-light-scattering." Specific examples of suitable particles are disclosed in U.S. Pat. No. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as $TiO_2$, $ZrO_2$, ZnO, $Al_2O_3$, $Sb_2O_3$, $BaSO_4$, $PbSO_4$ or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

As shown in FIG. 1C and FIG. 1D, an electrophoretic display (101, 102) typically includes a top transparent electrode 110, an electrophoretic medium 120, and a bottom electrode 130, which is often a pixel electrode of an active matrix of pixels controlled with thin film transistors (TFT). In the electrophoretic media 120 described herein, there are four different types of particles, 121, 122, 123, and 124, however more (or fewer) particle sets can be used with the methods and displays described herein. For example, the techniques of the invention could be used with a set of three types of particles, for example white, black, and red, wherein one of the three different types of particles has a charge magnitude lower than the other two types of particles. In some instances, two of the particles will be positively-charged, and one (or two) of the particles will be negatively-charged. In some instances, one of the particles will be positively-charged, and three particles will be negatively-charged. In some instances, one of the particles will be negatively-charged, and three particles will be positively-charged. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1D) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1C, the electrophoretic display may include a light-transmissive electrode, an electrophoretic medium, and a plurality of rear pixel electrodes. To produce a high-resolution display, e.g., for displaying images, each pixel electrode 130 is individually-addressable without interference from adjacent pixels so that an image file is faithfully reproduced on the display. One way to achieve this objective is to provide an array of non-linear elements, such as transistors or diodes, with at least one non-linear element associated with each pixel, to produce an "active matrix" display. (See FIG. 2.) An addressing or pixel electrode 130, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor.

It should be noted that the magnitude of the voltage that can be provided in such row-column driving can be limited by the materials from which the non-linear element, e.g., thin film transistor, is fabricated. In many embodiments the semiconductor material is silicon, especially amorphous silicon, which is able to control driving voltages on the order of ±15 V. In other embodiments, the semi-conductor of the thin-film-transistor may be a metal oxide, such indium gallium zinc oxide (IGZO), which allows for a wider range of driving voltages, e.g., up to ±30 V e.g., as described in U.S. Patent Publication No. 2022-0084473. This design feature is particularly pertinent when driving waveforms to sort the pigments of a multi-particle system. In such systems, it is beneficial to provide at least five voltage levels (high positive, low positive, zero, low negative, high negative), and with higher total voltages, it is easier to separate the particles. For greater details, see U.S. Patent Publication 2021-0132459. In some embodiments, voltages having a larger magnitude than ±30 V (e.g., ±35 V, ±45 V) can be applied during row-column driving by applying voltages other than substantially ground (e.g., 0 V) to the common voltage reference supply when driving the display.

In a conventional electrophoretic display using an active matrix backplane, each pixel electrode has associated therewith a capacitor electrode (storage capacitor) such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 2:
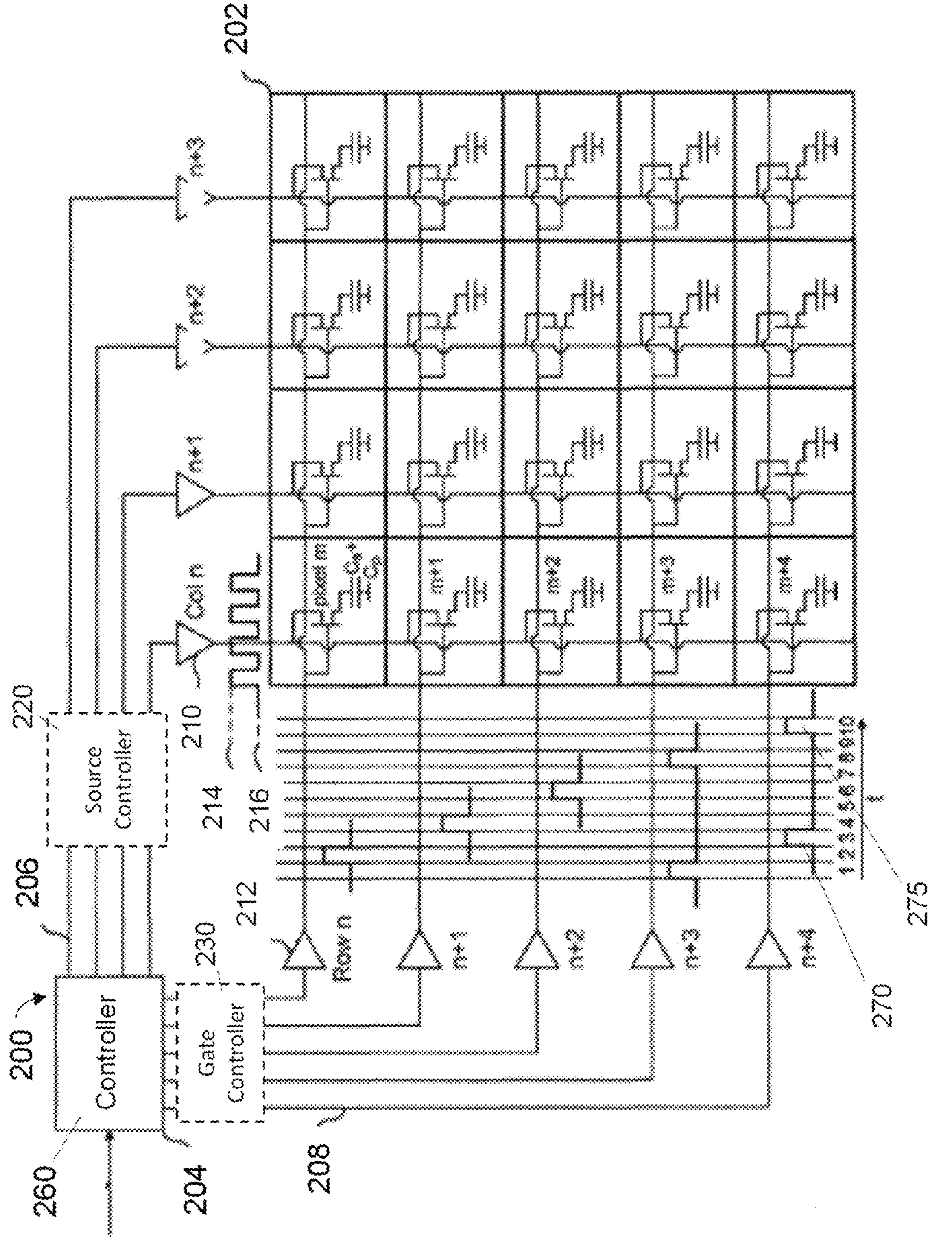
FIG. 2 is a diagrammatic view of an exemplary driving system for controlling voltages provided to pixel electrodes in an active matrix device. The resulting driving voltages can be used to set an optical state of a multi-particle electrophoretic medium.

Additional details of the row-column addressing used in an "active matrix" display are shown in FIG. 2. An addressing or pixel electrode, which addresses one pixel, is fabricated on a substrate 202 and connected to the appropriate voltages via lines 204 and 206 through the associated non-linear element. It is understood that the voltages supplied on lines 204 and 206 may originate from separate circuit elements or the voltages can be delivered with the assistance of a single power supply and a power management integrated circuit ("PMIC"). In some instances, an intervening source controller 220 and a gate controller 230 are used to control the supplied voltages to the source and gate lines, however in other embodiments the controller 260 is configured to control the entire addressing process, including coordinating the gate and source lines.

One of skill in the art will appreciate that the controller 260 of the present invention can be implemented in a number of different physical forms and can utilize a variety of analog and digital components. For example, the controller 260 can include a general purpose microprocessor in conjunction with appropriate peripheral components (for example, one or more digital-to-analog converters, "DACs") to convert the digital outputs from the microprocessor to appropriate voltages for application to pixels. Alternatively, the display controller circuitry can be implemented in an application specific integrated circuit ("ASIC") or field programmable gate array ("FPGA"). One of skill in the art will appreciate that the display controller circuitry can include both processing components and power management circuitry such as the PMIC described above.

It is also to be understood that FIG. 2 is an illustration of an exemplary layout of an active matrix backplane 200 but that, in reality, the active matrix has depth and some elements, e.g., the TFT, may actually be underneath the pixel electrode, with a via providing an electrical connection from the drain to the pixel electrode above. Further, the electrical traces that route signals from the gate and/or source controllers to the respective row and column select signals of the active matrix backplane 200 can be T-wires that run perpendicular to the signals they connect with.

Conventionally, in high resolution arrays, the pixels are arranged in a two-dimensional array of rows and columns, such that any specific pixel is uniquely defined by the intersection of one specified row and one specified column. The sources of all the transistors in each column are connected to a single column (scan) line 206, while the gates of all the transistors in each row are connected to a single row (gate) line 208; again the assignment of sources to rows and gates to columns is conventional but essentially arbitrary, and could be reversed if desired. The gate lines 208 are optionally connected to a gate line driver 212, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column scan lines 206 are optionally connected to scan line drivers 210, which place upon the various scan lines 206 voltages selected to drive the pixels in the selected row to their desired optical states. (The aforementioned voltages are relative to a common top electrode (e.g., $V_{COM}$) which is not shown in FIG. 2.)

With conventional driving, after a pre-selected interval known as the "line address time" the selected row is deselected, the next row is selected, and the voltages on the column drivers are changed so that the next line of the display is written. This process is repeated in a linear fashion so that the entire display is written in a row-by-row manner. As shown in FIG. 2, the temporal spacing between gate voltage pulses of respective frames is typically constant, and represent the rhythm of line by line addressing. Notably, the invention does not implement an even spacing between respective gate voltage pulses for a given address row of pixel electrodes.

Figure 3:
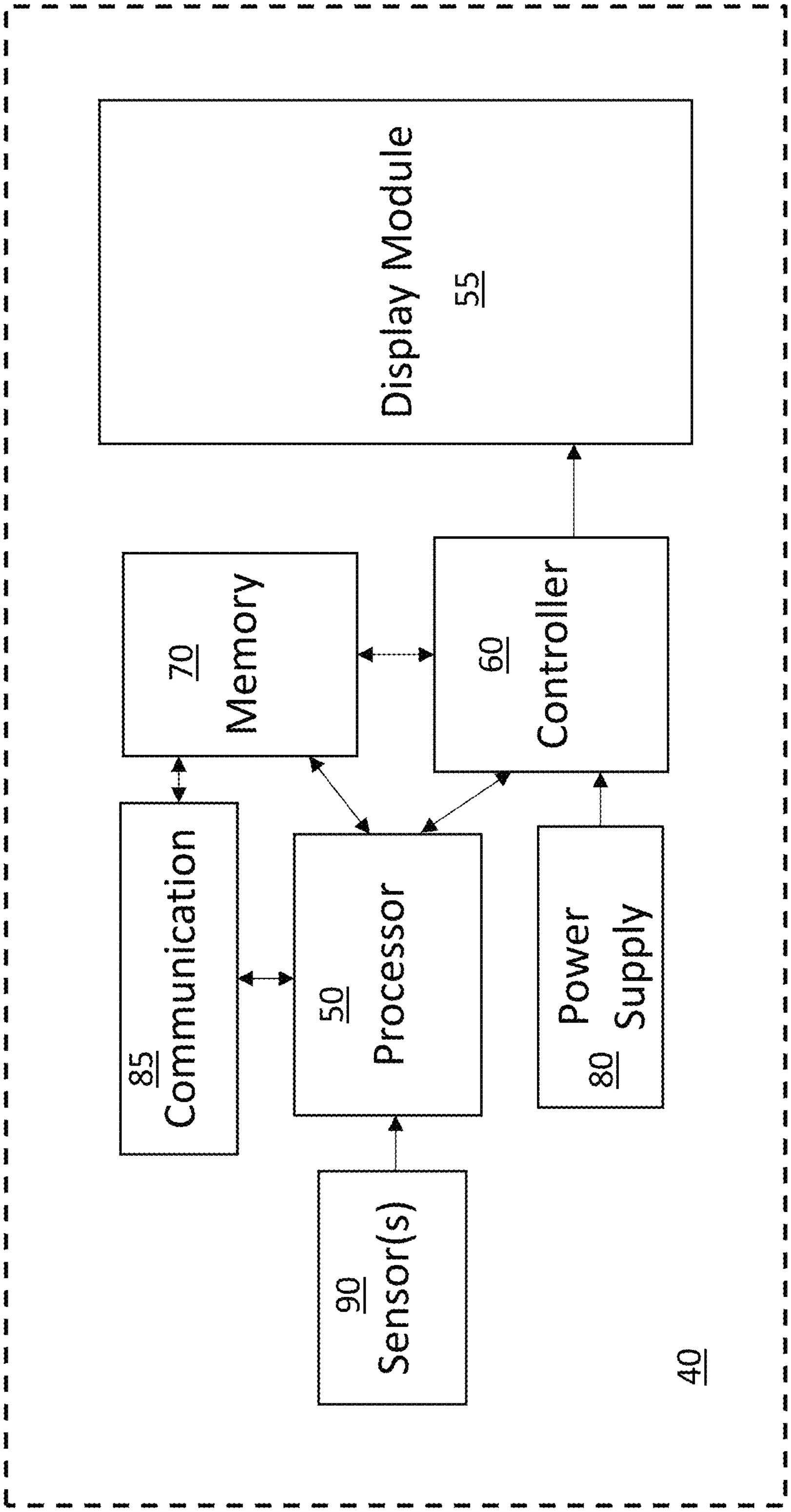
FIG. 3 illustrates an exemplary electrophoretic display that includes a display module. The electrophoretic display also includes a processor, non-transitory memory, one or more power supplies, and a controller. The electrophoretic display may also include sensors to allow the electrophoretic display to adjust operational parameters based upon the ambient environment, e.g., temperature and illumination.

The active matrix backplane described with respect to FIG. 2 is coupled to an electro-optic medium, e.g., as illustrated in FIGS. IC and ID, and typically sealed to create a display module 55, as shown in FIG. 3. Such a display module 55 becomes the focus of an electrophoretic display 40. The electrophoretic display 40 will typically include a processor 50, which is configured to coordinate the many functions relating to displaying content on the display module 55, and to transform "standard" images, such as sRGB images to a color regime that best duplicates the image on the display module 55. Of course, if the electrophoretic display is being used as a sensor or counter, the content may relate to other inputs. The processor is typically a mobile processor chip, such as made by Freescale or Qualcomm, although other manufacturers are known. The processor is in frequent communication with the non-transitory memory 70, from which it pulls image files and/or look up tables to perform the color image transformations described below. The non-transitory memory 70 may also include gate driving instructions to the extent that a particular color transition may require a different gate driving pattern. The electrophoretic display 40 may have more than one non-transitory memory chip. The non-transitory memory 70 may be flash memory. In many embodiments, the non-transitory memory 70 is incorporated directly into the end consumer device by incorporating all of the elements of FIG. 3 into a circuit board or package. However, in some instances, the driving circuitry is not directly incorporated into the display, such as when the display becomes the exterior of an object such as an automobile.

Waveforms (discussed below) are typically stored in the non-transitory memory 70, however they can also be incorporated into the controller 60 or the processor 50 or they can be stored on the cloud and downloaded via communications 85. A number of look-up tables can be used to facilitate the methods of the invention, especially to provide time shifted waveforms to the controller 60 as appropriate. In particular for a given transition from a first color to a second color in an electrophoretic medium having eight primaries a look up table could include instructions for updating from color 1 to a later color (with no time offset) in look-up slots 1 to 8, while instructions for updating from color 1 to a later color (with a first time offset) in look-up slots 9 to 16, and instructions for updating from color 1 to a later color (with a second time offset) in look-up slots 17 to 24, and so on. Of course, this type of look-up table can also be indexed for improved performance in view of operating conditions, such as device temperature, battery health, front-light color, front-light intensity, etc.

Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip or PMIC. The electrophoretic display 40 may additionally include communication 85, which may be, for example, WIFI protocols or BLUETOOTH, and allows the electrophoretic display 40 to receive images and instructions, which also may be stored in memory 70. The electrophoretic display 40 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

The layout of the active matrix backplane 200 shown in FIG. 2 and the various components of electrophoretic display 40 shown in FIG. 3 are provided as examples to facilitate the readers understanding of possible configurations of these structures. FIGS. 2 and 3 do not necessarily include all of the elements and components that may be present in an actual electrophoretic display incorporating an active matrix backplane, or all of the electrical traces and connections between the different elements of the backplane.

Figure 4A:
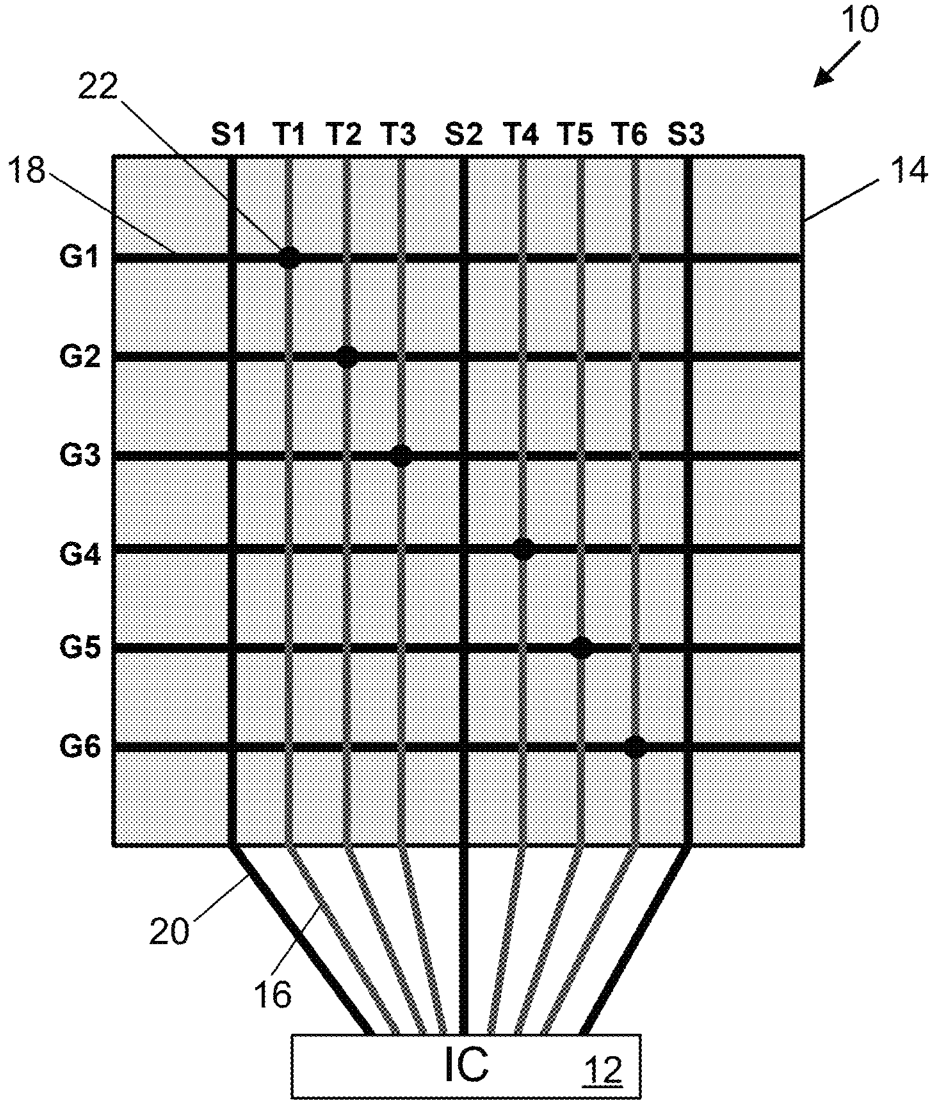
FIG. 4A is a diagrammatic view showing an exemplary gate and source signal routing layout for an active matrix backplane of an electro-optic display in accordance with the subject matter disclosed herein.

FIG. 4A is a diagrammatic view 10 showing an exemplary gate and source signal routing layout for an active matrix backplane of an electro-optic display. As shown in FIG. 4A, a series of T-wires 16 run from a driver chip or IC 12 along the back side of the display panel 14 and are then electrically coupled to particular gate lines 18 on the front side of the display panel 14 through individual conductive vias 22 that run through the display panel 14. In some embodiments, T-wires 16 are used to route connections to the source lines 20 in addition to, or instead of, the gate lines 18. In some embodiments, the IC 12 shown in FIG. 4A is located on the front or the back of the display panel substrate.

As shown in FIG. 4A, it is typical that one separate T-wire 16 and one separate via 22 are used to establish a connection with each individual gate line 18. In the arrangement shown in FIG. 4A most of the columns of pixels (i.e. the lines of pixels in the long dimension, which are shown as being vertically arranged in FIG. 4A) are associated with three separate T-wires 16; in various embodiments other numbers of T-wires 16 (e.g. 2, 4, or larger numbers) may be associated with each pixel column. The grouping of T-wires 16 running in the vertical direction typically corresponds to adjacent source lines 20, as shown in FIG. 4A.

Figure 4B:
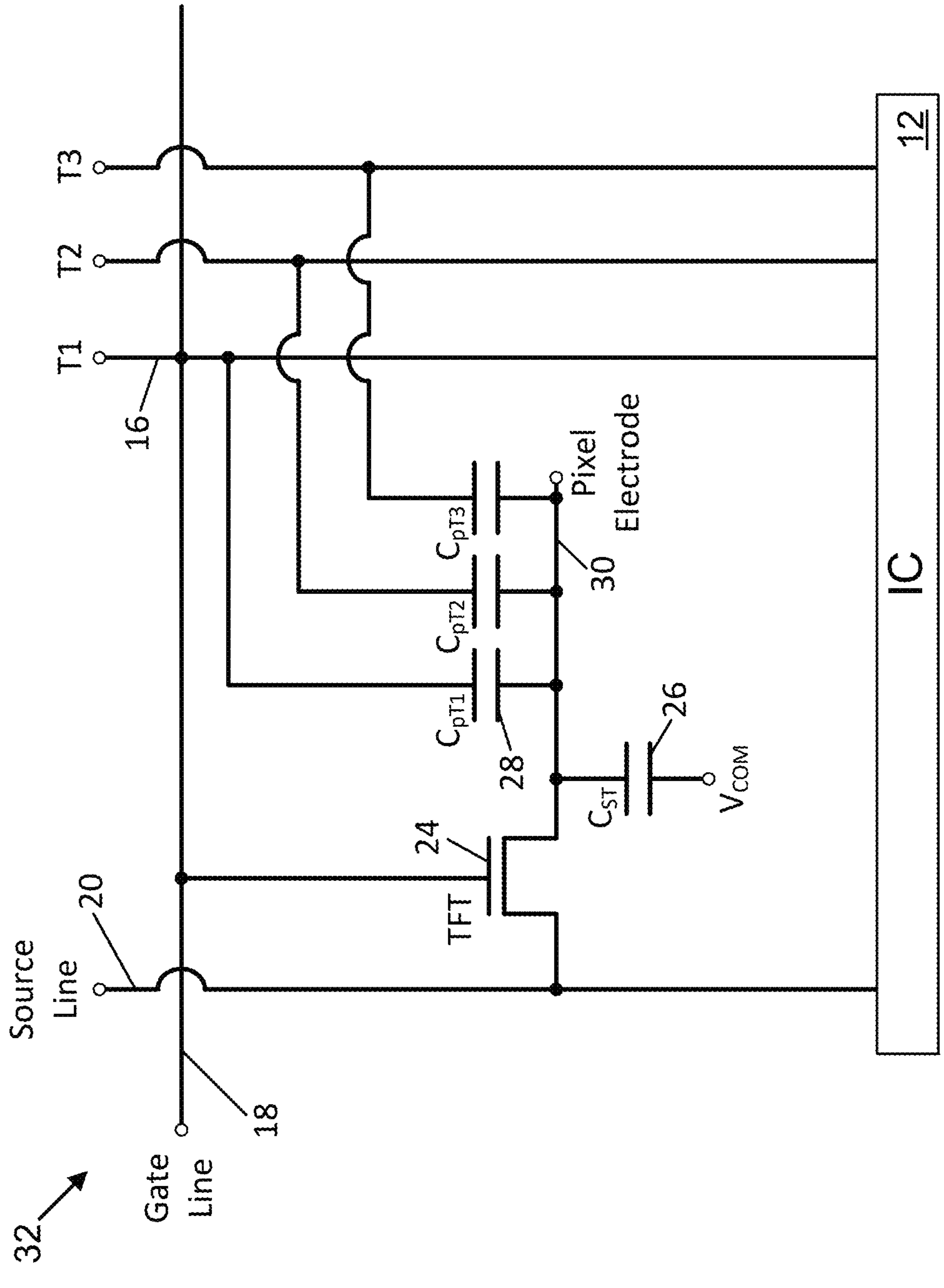
FIG. 4B is a schematic diagram of an exemplary display pixel in accordance with the subject matter disclosed herein.

FIG. 4B is a schematic diagram 32 of an exemplary display pixel including a TFT 24 for applying voltage waveforms from the source line 20 to the pixel electrode 30 when the gate line 18 is set to a voltage sufficient to put the TFT 24 in a conductive state. Further, a storage capacitor 26 is formed between the pixel electrode 32 and a common voltage or $V_{COM}$ voltage supply or plane. In some embodiments, direct or indirect coupling between the gate electrode of the TFT 24 and the pixel electrode 32 forms a parasitic capacitance (not show in FIG. 4B). Three T-wires 16 (e.g., T1, T2, and T3) are routed vertically in proximity to the display pixel to provide connection points between the row select signals driven from the driver IC 12 and the gate lines 18 of the display.

When using the configuration exemplified in FIGS. 4A and 4B, because the display substrate is typically made from a non-conductive material, a capacitance is created between the pixel electrode 32 and the multiple T-wires 16. For example, as shown in FIG. 4B, three parasitic capacitances 28 (e.g., $C_{pT1}$, $C_{pT2}$, and $C_{pT3}$) are formed between the T-wires 16 and the pixel electrode 30. Because the T-wires 16 are typically arranged in an orderly fashion, it is often the case the multiple T-wires 16 in close proximity are energized at the same time because they are being used to drive transitions of nearby pixel neighbors in the pixel array. This capacitive coupling can lead to unwanted optical defects such as varied optical characteristics or response across different areas of a display due to certain operations.

As indicated above, when using conventional methods for driving electrophoretic displays, the portions of the electrophoretic layer positioned above gate lines, above pixel electrodes that are positioned above gate lines, and above T-wire routing lines that connect to gate and/or source lines can experience voltage artifacts caused by the power up and power down of the gate low voltage prior to updating a display. The invention described herein reduces or minimizes the adverse effects of the voltage artifacts induced on the electrophoretic layer by conventional driving methods. In particular, the present invention provides a method to power up and power down the gate low voltage in a staged manner that breaks the voltage artifact experienced into multiple, lower amplitude voltage artifacts. It has been observed that the electrophoretic layer is much less responsive to a series of smaller voltage impulses temporally spaced apart in succession than to a single, higher-amplitude voltage impulse. Accordingly, the staged method of powering up and down the gate low voltage described herein results in fewer optical artifacts on the display.

According to the invention, power up of the gate low voltage of an active-matrix display is performed in two or more stages to bring the gate line voltage from zero volts to a negative value in preparation for a display update cycle. The voltage applied to the gate lines of the pixel TFTs increases in amplitude at each stage, and the stages are temporally separated by a time that is at least a significant fraction of the natural relaxation time of the voltage artifact induced on the electrophoretic layer. In this manner, most or all of the voltage associated with the voltage artifact can decay or discharge during the time between stages. Preferably, the time between stages is on the order of this natural relaxation time, and more preferably, significantly greater than this natural relaxation time for relaxation time values exhibited through at least a portion of the operating temperature range of an electro-optic display device. This allows all of the voltage associated with the voltage artifact to discharge during the time between stages.

Power down of the gate low voltage of an active-matrix display is also performed in two or more stages to bring the gate line voltage from the gate low voltage value back to zero volts after a display update cycle has concluded. The voltage applied to the gate lines of the pixel TFTs decreases in amplitude at each stage, and the stages for powering down the gate low voltage are temporally separated in a similar manner to the power up stages described above.

Figure 5A:
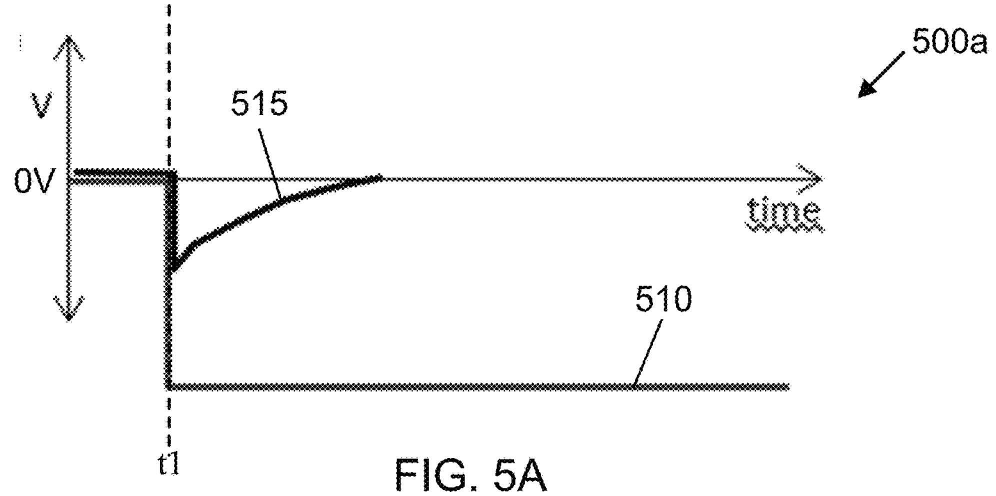
FIG. 5A is a signal waveform diagram illustrating a voltage artifact experienced by the electrophoretic material when powering up the gate low voltage in a single stage using conventional driving methods.

FIG. 5A is a signal waveform diagram 500*a* illustrating a voltage artifact experienced by the electrophoretic material when powering up the gate low voltage in a single stage using conventional driving methods. Signal trace 510 illustrates the voltage of the gate line, and signal trace 515 illustrates the voltage measured across the electrophoretic material of the display. Referring to signal trace 510, at time $t_1$ the gate line is driven to the gate low voltage in a single stage. Referring to signal trace 515, it can be seen that powering up the gate low voltage in this manner induces a voltage artifact on the electrophoretic material having a magnitude nearly half as large as the magnitude of the gate low voltage applied to the gate line.

In some embodiments, the gate low voltage applied to the gate line is −35V. However, as discussed above, the voltage applied to the row (e.g., gate) and column (e.g., source) signals can vary (e.g., ±15 V, ±30 V, ±35 V ±45 V) depending upon the materials from which the TFTs are fabricated.

Figure 5B:
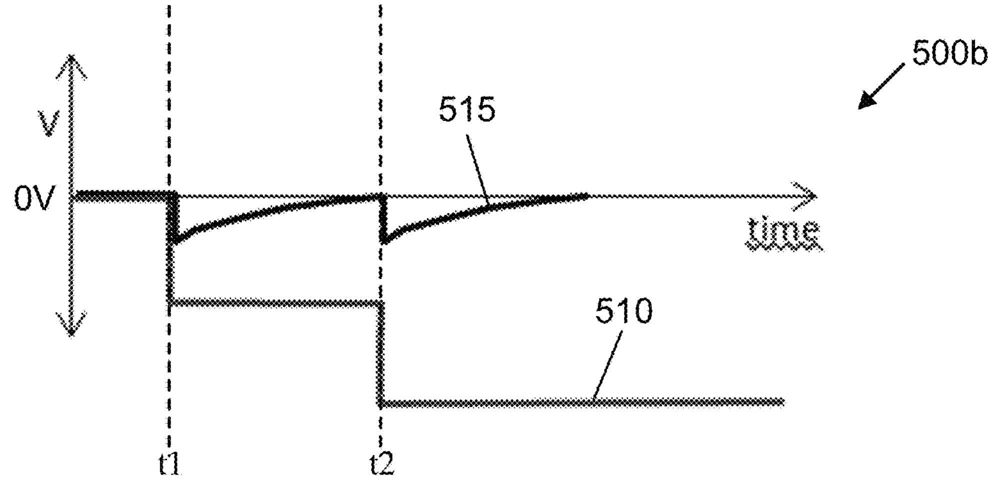
FIG. 5B is a signal waveform diagram illustrating voltage artifacts experienced by the electrophoretic material when powering up the gate low voltage in two stages in accordance with the driving methods disclosed herein.

FIG. 5B is a signal waveform diagram 500*b* illustrating voltage artifacts experienced by the electrophoretic material when powering up the gate low voltage in two stages in accordance with the driving methods disclosed herein. Referring to signal trace 515, at time $t_1$ the gate line is driven to a first stage voltage which induces a voltage artifact (e.g., a first voltage artifact) on the electrophoretic material. In some embodiments, the first stage voltage has a magnitude substantially half that of the gate low voltage. The gate line voltage is maintained at the first stage voltage for a first period of time, and is subsequently driven to the gate low voltage at time $t_2$, which induces a voltage artifact (e.g., a second voltage artifact) on the electrophoretic material. The gate line is then maintained at the gate low voltage for a second period of time, in this case, for the remainder of the driving cycle, although it can be shorter in some embodiments. As shown in FIG. 5B, the first period of time is greater than or equal to the time it takes for the first voltage artifact to dissipate or discharge (e.g., decay to approximately 0V or a reference voltage of the display). Likewise, the second period of time is greater than or equal to the time it takes for the second voltage artifact to decay or discharge.

Referring to signal trace 515 in FIG. 5B, it can be seen that powering up the gate low voltage in two stages induces the first and second voltage artifacts on the electrophoretic material at the beginning of each respective stage, and the voltage artifacts each have a magnitude nearly half as large as the magnitude of the voltage differential applied to the gate line at each stage. Using a gate low voltage of −45V as an example, if the gate line is driven from 0V to −22.5V at the start of the first stage, the voltage differential is 22.5V, and the magnitude of the voltage artifact induced on the electrophoretic material is less than half of −22.5V. When the gate line is then driven from −22.5V to −45V at the start of the second stage, the voltage differential between the first stage and the second stage is again 22.5V, and the magnitude of the voltage artifact induced on the electrophoretic material is again less than half of −22.5V. Further, it can be seen in signal trace 515 that the voltage artifact induced at time $t_1$ has discharged or decayed back to approximately 0V by time $t_2$, and the voltage artifact induced at time $t_2$ has discharged or decayed back to approximately 0V within a similar time after time $t_2$.

Figure 5C:
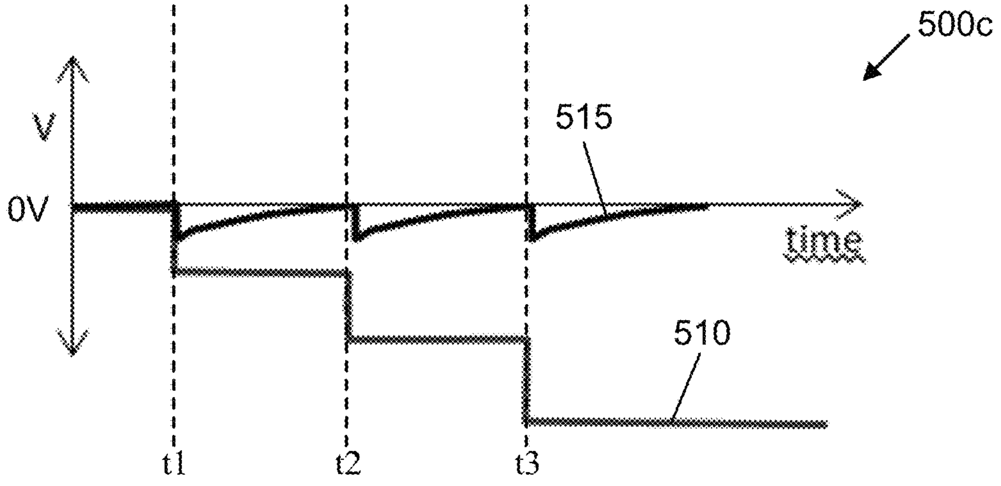
FIG. 5C is a signal waveform diagram illustrating voltage artifacts experienced by the electrophoretic material when powering up the gate low voltage in three stages in accordance with the driving methods disclosed herein.

FIG. 5C is a signal waveform diagram 500*c* illustrating voltage artifacts experienced by the electrophoretic material when powering up the gate low voltage in three stages in accordance with the driving methods disclosed herein. Referring to signal trace 515, at time $t_1$ the gate line is driven to a first stage voltage which induces a voltage artifact (e.g., a first voltage artifact) on the electrophoretic material. In some embodiments, the first stage voltage has a magnitude substantially one third that of the gate low voltage. The gate line voltage is maintained at the first stage voltage for a first period of time, and is subsequently driven to a second stage voltage at time $t_2$, which induces a voltage artifact (e.g., a second voltage artifact) on the electrophoretic material. In some embodiments, the second stage voltage has a magnitude substantially two thirds that of the gate low voltage. The gate line voltage is maintained at the second stage voltage for a second period of time, and is subsequently driven to the gate low voltage at time $t_3$, which induces a voltage artifact (e.g., a third voltage artifact) on the electrophoretic material. The gate line is then maintained at the gate low voltage for a third period of time, in this case, for the remainder of the driving cycle, although it can be shorter in some embodiments.

As shown in FIG. 5C, the first period of time is greater than or equal to the time it takes for the first voltage artifact to decay or discharge. Likewise, the second period of time is greater than or equal to the time it takes for the second voltage artifact to decay or discharge, and the third period of time is greater than or equal to the time it takes for the third voltage artifact to decay or discharge.

Referring to signal trace 515 in FIG. 5C, it can be seen that powering up the gate low voltage in three stages induces first, second, and third voltage artifacts on the electrophoretic material at the beginning of each respective stage, and the voltage artifacts each have a magnitude nearly half as large as the magnitude of the voltage differential applied to the gate line at each stage. For example, if the gate line is driven from 0V to −15V at the start of the first stage, the voltage differential is 15V, and the magnitude of the voltage artifact induced on the electrophoretic material is less than half of −15V. When the gate line is then driven from −15V to −30V at the start of the second stage, the voltage differential between the first stage and the second stage is again 15V, and the magnitude of the voltage artifact induced on the electrophoretic material is again less than half of −15V. Finally, when the gate line is then driven from −30V to −55V at the start of the third stage, the voltage differential is again 15V, and the magnitude of the voltage artifact induced on the electrophoretic material is again less than half of −15V.

It can be seen in signal trace 515 that the voltage artifact induced at time t has discharged or decayed back to approximately 0V by time $t_2$, the voltage artifact induced at time $t_2$ has discharged or decayed back to approximately 0V by time $t_3$, and the voltage artifact induced at time $t_3$ has discharged or decayed back to approximately 0V within a similar amount of time as the other two stages after time $t_3$.

As discussed above, the voltage applied to the gate line at each stage is maintained for a period of time before applying the voltage of the next state. In some embodiments, the stages are separated in time by at least a significant amount of the decay time of the voltage artifacts they induce. For example, the voltage artifact decay time after each stage (and therefore the minimum time delay between stages) can be on the order of 30 to 50 ms, depending on factors such as the backplane construction and the conductivity of the electrophoretic material. Accordingly, in some embodiments, the time delay added to a conventional one stage routine by powering up the gate low voltage in two stages is approximately 30-50 ms. In some embodiments, the time delay added to a conventional one stage routine by powering up the gate low voltage in three stages is approximately 60-100 ms. In some embodiments, the time delay added to a conventional one stage routine for powering up the gate low voltage in four stages is approximately 90-150 ms. The invention is not limited to using only 2 or 3 stages. A person of ordinary skill in the art will appreciate that depending on the system requirements of the display, more delay in powering up the gate low voltage may be tolerable, and any number of stages can be used.

Figure 6A:
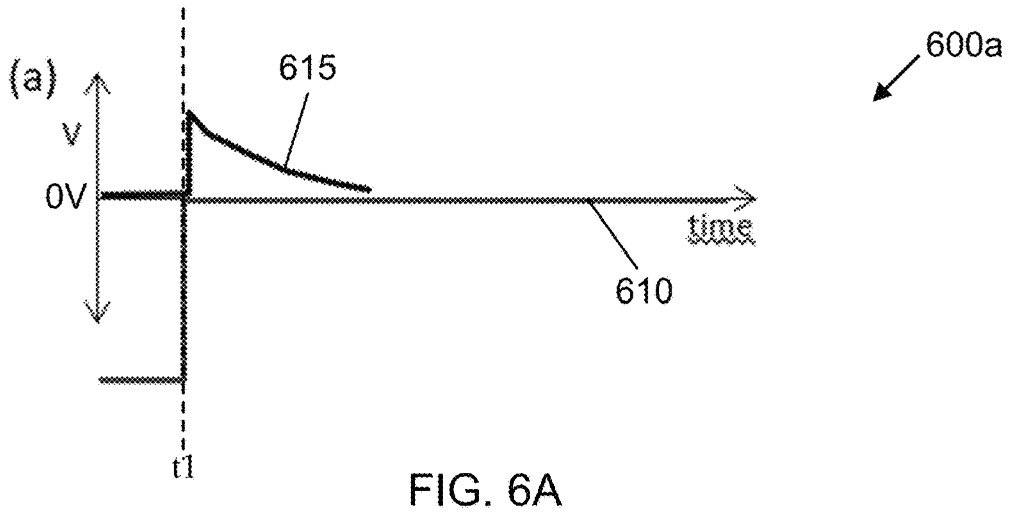
FIG. 6A is a signal waveform diagram illustrating a voltage artifact experienced by the electrophoretic material when powering down the gate low voltage in a single stage using conventional driving methods.
Figure 6B:
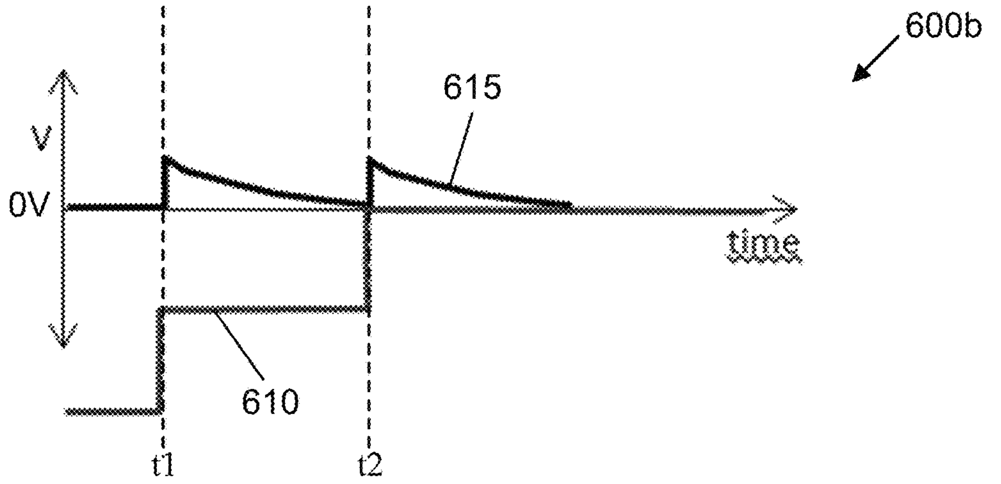
FIG. 6B is a signal waveform diagram illustrating voltage artifacts experienced by the electrophoretic material when powering down the gate low voltage in two stages in accordance with the driving methods disclosed herein.
Figure 6C:
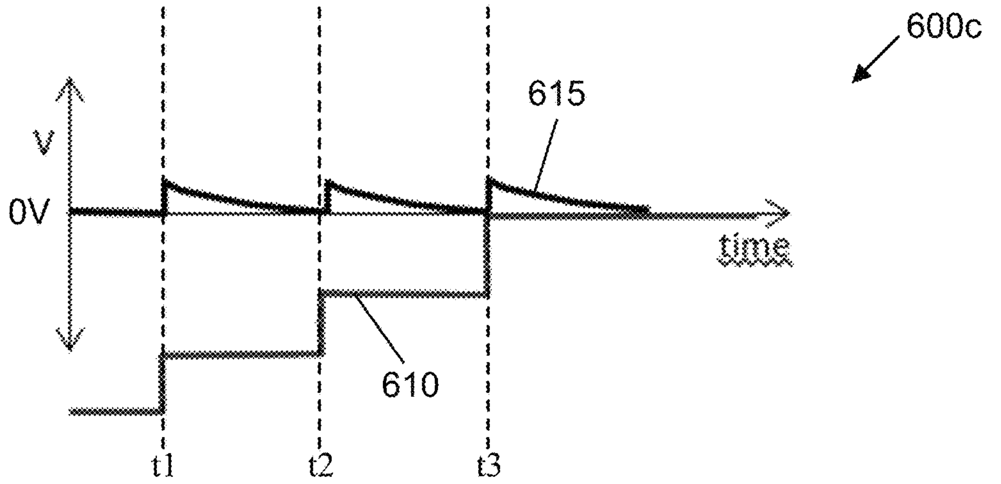
FIG. 6C is a signal waveform diagram illustrating voltage artifacts experienced by the electrophoretic material when powering down the gate low voltage in three stages in accordance with the driving methods disclosed herein.

FIGS. 6A-6C are signal waveform diagrams illustrating the voltage artifacts experienced by the electrophoretic material when powering down the gate low voltage in a single stage using conventional driving methods (FIG. 6A), powering down the gate low voltage in two stages (FIG. 6B), and powering down the gate low voltage in three stages (FIG. 6C). In FIGS. 6A-6C, signal trace 610 illustrates the voltage of the gate line, and signal trace 615 illustrates the voltage measured across the electrophoretic material of the display. Referring to signal trace 615 in each figure, it can be seen that the voltage artifacts induced on the electrophoretic material by powering down the gate low voltage in one, two, or three stages are substantially similar to the voltage artifacts induced in FIGS. 5A-5C above for the respective method of powering up the gate low voltage, with the exception that the magnitudes of the voltage artifacts induced by powering down the gate low voltage are positive instead of negative.

It is noted that this disclosure is primarily directed to an active-matrix display that uses n-type thin-film transistors within its pixel array. However, one of ordinary skill in the art will appreciate that the electro-optic displays and methods for driving electro-optic displays disclosed herein are equally applicable to active-matrix displays based instead upon p-type TFTs and the "gate high" voltage that is applied to the gate line of each pixel TFT to achieve the non-addressed or deselected state for each row.

Accordingly, the invention described herein reduces or minimizes undesired optical artifacts resulting from capacitive coupling between gate lines and their associated T-wire lines with overlying pixel electrodes or overlying electrophoretic material. Powering up and powering down the gate low voltage in a staged manner breaks the voltage artifact experienced into a series of lower amplitude voltage artifacts to which the electrophoretic layer is much less responsive than to a single, higher-amplitude voltage impulse.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method for driving an electro optic display wherein the first stage voltage has a first magnitude that is substantially one third of a gate low voltage;

the second stage voltage has a second magnitude that is substantially two thirds of the gate low voltage; maintain the second stage voltage on the gate line for a second period of time; and apply a third stage voltage to the gate line, wherein the third stage voltage has a third magnitude that is substantially the gate low voltage; and maintain the third stage voltage on the gate line for a third period of time.

2. The method of claim 1 wherein the gate low voltage has a magnitude of substantially −35V.

3. The method of claim 1 wherein the pixel transistor is an n-type transistor, and the gate low voltage has a negative polarity.

4. The method of claim 1 wherein the pixel transistor is a p-type transistor, and the gate low voltage has a positive polarity.

5. The method of claim 1 wherein each of the first period of time and the second period of time is between 30 ms and 50 ms.

6. The method of claim 1 wherein applying the first stage voltage to the gate line causes a first voltage artifact on the layer of electrophoretic material.

7. The method of claim 6 wherein the first period of time is greater than or equal to a discharge time of the first voltage artifact.

8. The method of claim 1 wherein applying the second stage voltage to the gate line causes a second voltage artifact on the layer of electrophoretic material.

9. The method of claim 8 wherein the second period of time is greater than or equal to a discharge time of the second voltage artifact.

10. The method of claim 1 wherein applying the third stage voltage to the gate line causes a third voltage artifact on the layer of electrophoretic material.

11. The method of claim 10 wherein the third period of time is greater than or equal to a discharge time of the third voltage artifact.

12. An electro-optic display comprising:

a controller wherein the first stage voltage has a first magnitude that is substantially one third of a gate low voltage; wherein the second stage voltage has a second magnitude that is substantially two thirds of the gate low voltage; maintain the second stage voltage on the gate line for a second period of time; and apply a third stage voltage to the gate line, wherein the third stage voltage has a third magnitude that is substantially the gate low voltage; and maintain the third stage voltage on the gate line for a third period of time.

13. The electro-optic display of claim 12 wherein the gate low voltage has a magnitude of substantially −35V.

14. The electro-optic display of claim 12 wherein the pixel transistor is an n-type transistor, and the gate low voltage has a negative polarity.

15. The electro-optic display of claim 12 wherein the pixel transistor is a p-type transistor, and the gate low voltage has a positive polarity.

16. The electro-optic display of claim 12 wherein each of the first period of time and the second period of time is between 30 ms and 50 ms.

17. The method of claim 12 wherein applying the first stage voltage to the gate line causes a first voltage artifact on the layer of electrophoretic material.

18. The method of claim 17 wherein the first period of time is greater than or equal to a discharge time of the first voltage artifact.

19. The method of claim 12 wherein applying the second stage voltage to the gate line causes a second voltage artifact on the layer of electrophoretic material.

20. The method of claim 19 wherein the second period of time is greater than or equal to a discharge time of the second voltage artifact.

21. The method of claim 12 wherein applying the third stage voltage to the gate line causes a third voltage artifact on the layer of electrophoretic material.

22. The method of claim 21 wherein the third period of time is greater than or equal to a discharge time of the third voltage artifact.

* * * * *